United States Patent [19]

Stevens et al.

[11] Patent Number: 5,964,840
[45] Date of Patent: Oct. 12, 1999

[54] METHOD FOR RECOGNIZING OVERLOAD SITUATIONS IN SUBSCRIBER LINE MODULES OF A COMMUNICATION SYSTEM

[75] Inventors: Peter Stevens, Rheda-Wiedenbrueck; Wolfgang Pusch, Bueren, both of Germany

[73] Assignee: Siemens Aktiengesellschaft, Munich, Germany

[21] Appl. No.: 08/715,913

[22] Filed: Sep. 19, 1996

[30] Foreign Application Priority Data

Sep. 20, 1995 [DE] Germany .................... 195 34 940

[51] Int. Cl.⁶ ............... G06F 13/00; H04L 12/26
[52] U.S. Cl. ........................... 709/235; 709/224
[58] Field of Search ............. 395/200.3, 200.31, 395/200.36, 200.44, 200.53, 200.54, 200.57, 200.61, 200.62, 200.65, 200.71, 200.74, 200.82, 566, 651, 652, 670, 671, 672, 673, 674, 675, 729, 750.06, 827, 838, 872, 877, 879, 876; 709/200, 201, 206, 214, 223, 224, 227, 231, 232, 235, 241, 244, 252, 100, 101, 102, 103, 104, 105; 710/241, 7, 18, 52, 57, 59, 56

[56] References Cited

U.S. PATENT DOCUMENTS

| | | |
|---|---|---|
| 4,511,762 | 4/1985 | Stockdale . |
| 4,613,729 | 9/1986 | Daisenberger ............... 179/8 |
| 4,905,171 | 2/1990 | Kiel et al. ............ 364/551.01 |
| 5,313,454 | 5/1994 | Bustini et al. ............. 370/13 |
| 5,487,072 | 1/1996 | Kant ......................... 371/32 |
| 5,528,589 | 6/1996 | Nishidai ..................... 370/60 |
| 5,574,861 | 11/1996 | Lorvig et al. ........ 395/200.06 |
| 5,604,866 | 2/1997 | Kolb et al. .......... 395/200.13 |

FOREIGN PATENT DOCUMENTS

2278027  11/1994  United Kingdom .

Primary Examiner—Mark H. Rinehart
Assistant Examiner—Marc D. Thompson
Attorney, Agent, or Firm—Hill & Simpson

[57] ABSTRACT

The workloads (Z, ZS, ZS(X), gn1) of a microprocessor system (MPS), of all signaling channels (D) to the connected communication terminal equipment units (KE) and of a memory element pool (SEP) are measured in subscriber line modules (SLMO) of a communication system (KS). The measured workloads are compared to predetermined workload limits (GZ, GZS, gzn1), and an overload of a subscriber line module (SLMO) is recognized dependent on the comparison results. Designational or summary, fast-acting countermeasures can be initiated on the basis of the early recognition of at least two overloads.

21 Claims, 6 Drawing Sheets

METHOD FOR RECOGNIZING OVERLOAD SITUATIONS IN SUBSCRIBER LINE MODULES OF A COMMUNICATION SYSTEM

BACKGROUND OF THE INVENTION

Program-controlled communication systems have a central controller and subscriber line modules connected thereto with which are realized communication terminals for a connection of communication terminal equipment. For example, a subscriber line module makes available 24 communication terminals to which at least 24 communication terminal equipment are connectable. A signaling channel (known as D-channel in the technical field) having, for example, a standardized transmission capacity of 16 kBit/s is conducted via each of these communication terminals. Signaling messages are sent both to the communication terminal equipment as well as to the communication system via the signaling channel. A substantially higher flow of signaling messages from the communication system to the communication terminal equipment units occurs due to the switching-oriented settings of the user surface of the communication terminal equipment units (particularly given stimulus communication terminal equipment) by the communication system. Particularly given specific uses of the communication terminal equipment, this can lead to an elevated flow of signaling messages from the communication terminal equipment and, thus, to an overload of the subscriber line modules.

Further, the subscriber line modules each respectively have a microprocessor system with which the processing requests communicated from the processes implemented in the subscriber line modules are processed. The processes are thereby organized as autonomous tasks that have various priority levels with respect to the message processing. The resource processing capacity of the microprocessor system is provided within a subscriber line module for message processing in the inter-process communication and for resource administration of the further resources on the subscriber line module. An overload of the microprocessor system is caused both by substantial message flow in the direction of the communication terminal equipment units as well as by the messages to be communicated to the central controller.

A known method for identifying the overload of a subscriber line module is to utilize the plurality of memory elements that are still free in a memory element pool administered by the operating system. The memory elements are temporarily allocated to the respective processes or, respectively, tasks for the intermediate storage of information, i.e. the respective process can store its data or, respectively, information on the memory elements allocated to it.

An exclusive monitoring of the memory element pool for a judgement of an overload is disadvantageous since the overload condition is recognized too late and, thus, fast-acting counter measures cannot be initiated. The subscriber line module is switched into a disturbed condition after the transgression of an overload threshold and this can only be canceled by a restart, i.e. a reset of the subscriber line module.

SUMMARY OF THE INVENTION

It is an object of the present invention to provide a method for recognizing an overload of a subscriber line module such that a general disturbed condition or, respectively, an outage of the subscriber line module is avoided by predetermined counter measures after a recognition.

An important aspect of the inventive method is that the workload of a microprocessor system, of the signaling channels directed to the communication terminal equipment units and of the memory element pool is continuously monitored for recognizing an overload. An overload of the subscriber line module is recognized by comparisons of measured workloads to predetermined workload limits. After a recognition of at least two or three overloads, designational or overall, fast-acting counter measures can be initiated. One of these counter measures, for example, is that the formation and communication of signaling messages that substantially influences the processor processing resources is restricted at the communication equipment that cause a flood of signaling messages. Those communication terminal equipment units to which the greatest plurality of signaling messages is currently communicated can thereby be designationally identified and an appropriate countermeasure can be initiated, namely to no longer transmit all signaling messages. In particular, these are signaling messages that are optically or verbally output in the communication terminal equipment units. As a further countermeasure, individual or all communication terminals can be deactivated in order to avoid a currently pending overload of the respective subscriber line module.

A plurality of overload steps are advantageously recognized by comparisons of the measured workloads to respectively different, predetermined workload limits. This overload strategy is meaningful given a multi-stage counter measure strategy, whereby the individual countermeasures represent a part of parts of an overall strategy.

According to an advantageous development of the inventive method, an overload of the subscriber line module is recognized when the measured workloads upwardly exceed the predetermined workload limits. Consequently, a downward transgression of the predetermined workload limits represents a normal workload. In order to suppress extremely brief-duration overloads and mismeasurements, the upward transgression or downward transgression of workload limits is only determined when these are measured within a predetermined time interval.

Advantageously, the workload of the microprocessor system is determined by the plurality of processed no-load tasks within a predetermined time interval. When the measured plurality downwardly transgresses a predetermined plurality of no-load tasks representing the workload limit, an overload of the microprocessor system has been recognized. Advantageously, the plurality of no-load tasks is acquired by a counter. It is to be understood that the term "no-load task" refers to an idle task, that is, a task whose contribution to the processor load is negligible.

The workload of the signaling channel is especially advantageously measured by determining an overall message length. The message lengths of the individual signaling messages are thereby acquired for each signaling channel and summed up to form an overall message length. When, within a time interval this overall message length exceeds a limit message length representing the workload limit, the overload is recognized by the signaling to the communication terminal equipment units.

A first overload condition of a subscriber line module is identified when the workload limits are constantly upwardly transgressed within an overload interval. A message indicating the first overload condition is thereby formed. This additional measure avoids the initiation of countermeasures given brief-duration upward transgressions of individual workload limits and designational counter measures can be initiated given a determination thereof.

The overload of the memory element pool is advantageously identified by measuring the memory elements that are still free. The measured, free memory elements are thereby compared to a predetermined plurality representing the workload limit and an overload of the memory element pool is identified when the predetermined plurality is downwardly transgressed. The workload of the memory element pool is advantageously measured after each transmission of a signaling message to a connected communication terminal equipment. This point in time is advantageous since a further transmission of messages can be avoided given a potential transgression of the workload limit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
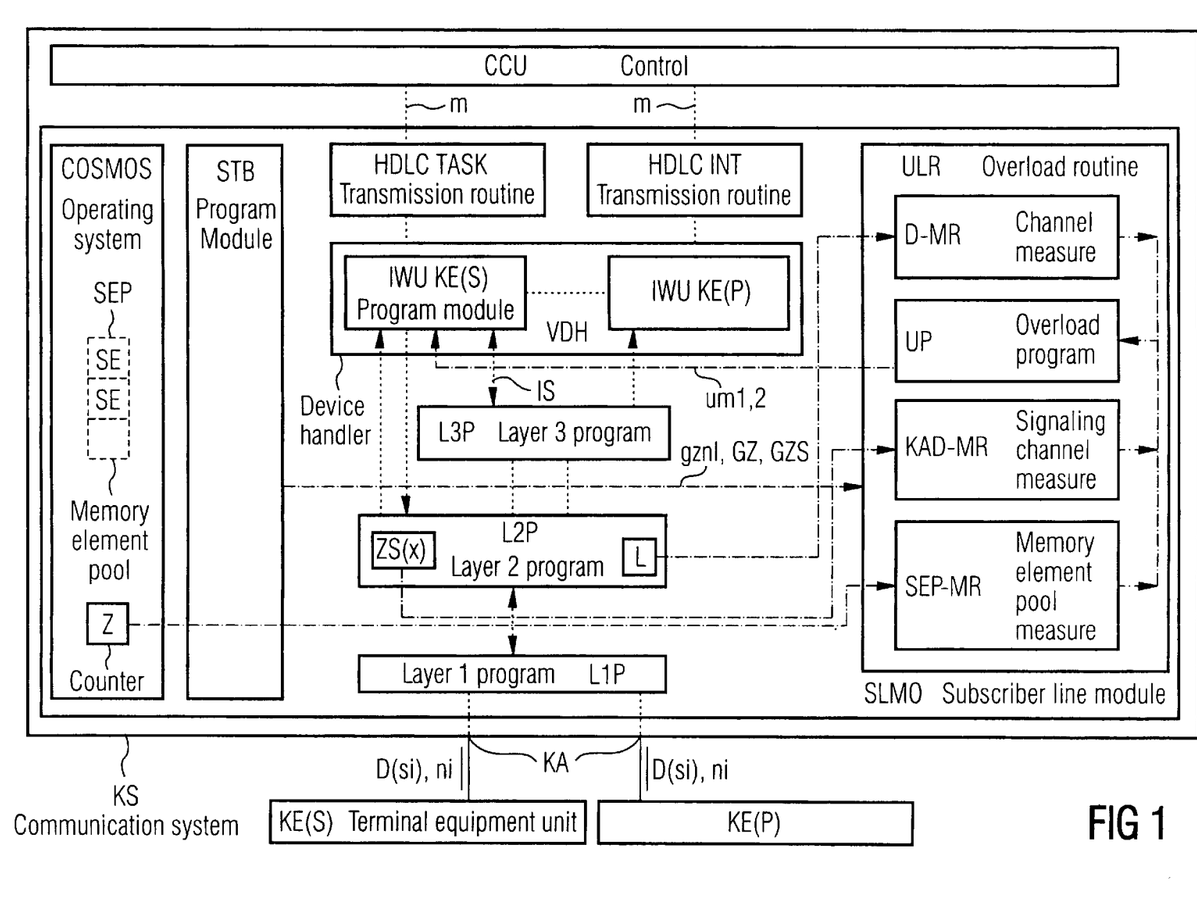
FIG. 1 depicts a program structure of a subscriber line module in a communication system.
Figure 2:
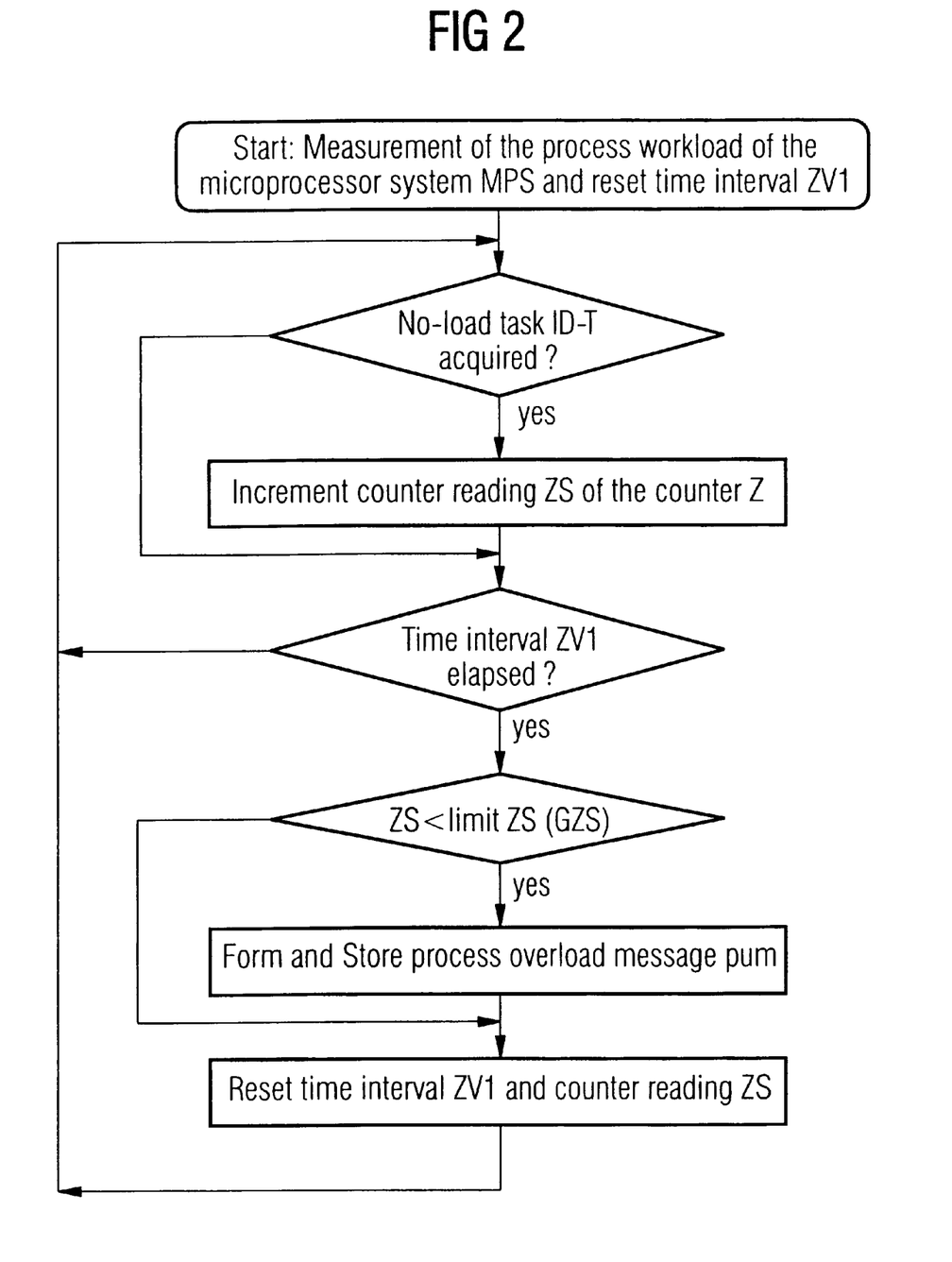
FIG. 2 is a flowchart showing the measurement of the process workload of the microprocessor system.
Figure 3:
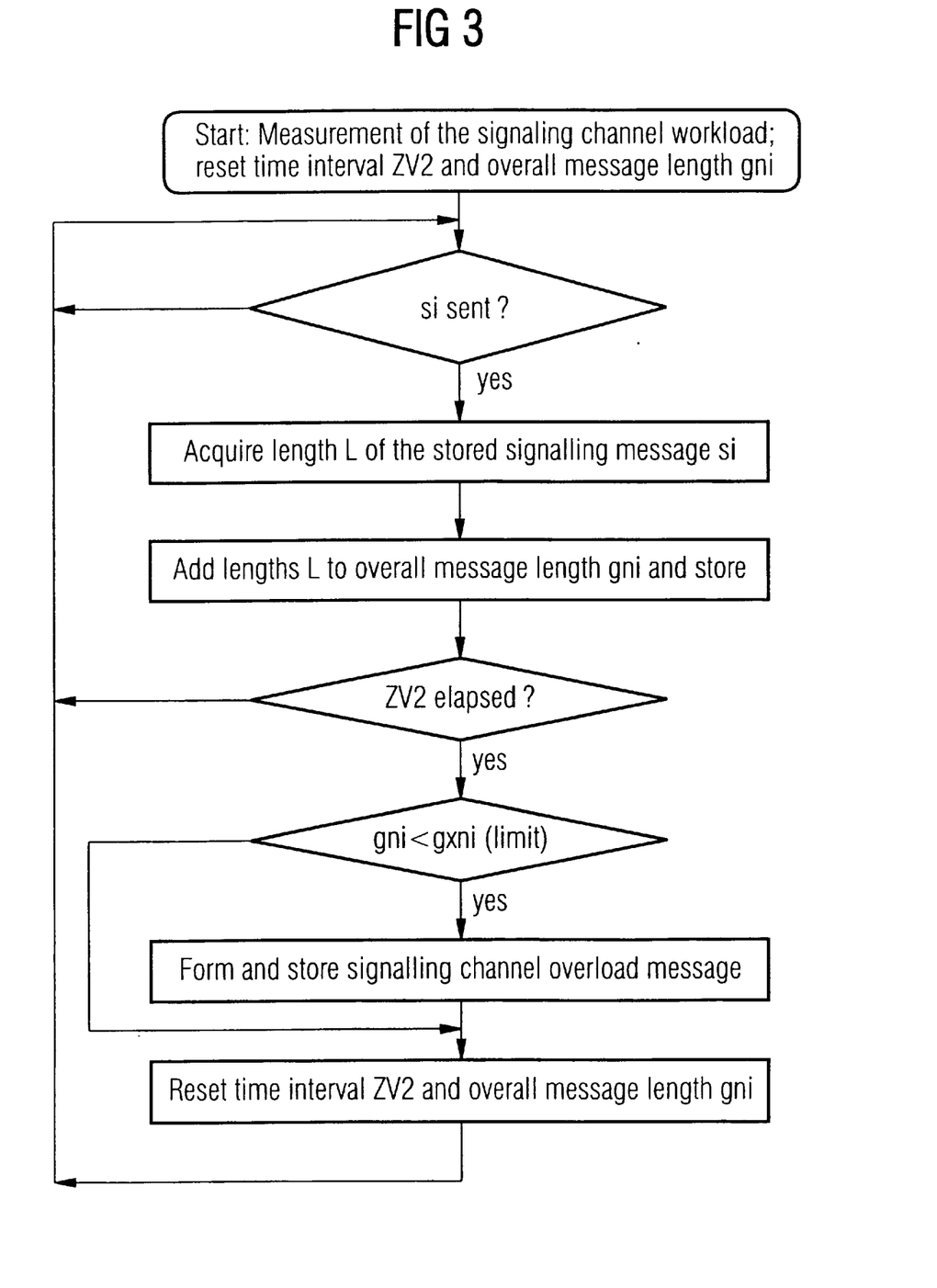
FIG. 3 is a flowchart showing the measurement of the signaling channel workload.
Figure 4:
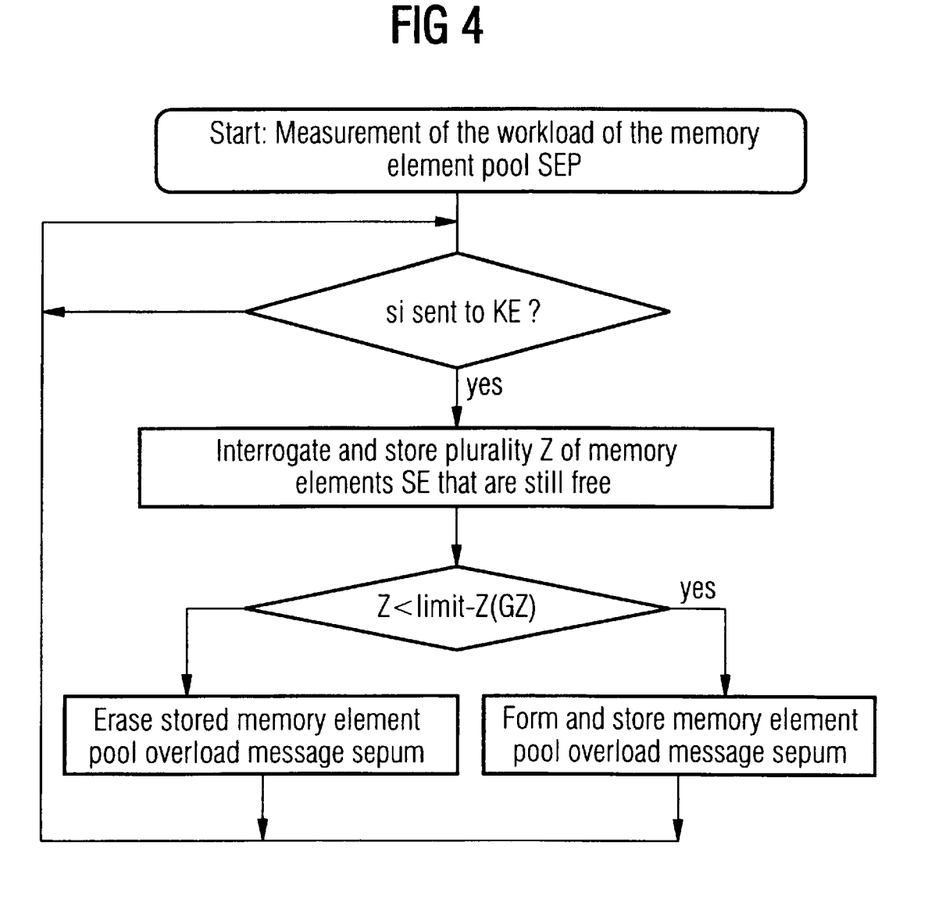
FIG. 4 is a flowchart showing the measurement of the workload of the memory element pool.
Figure 5:
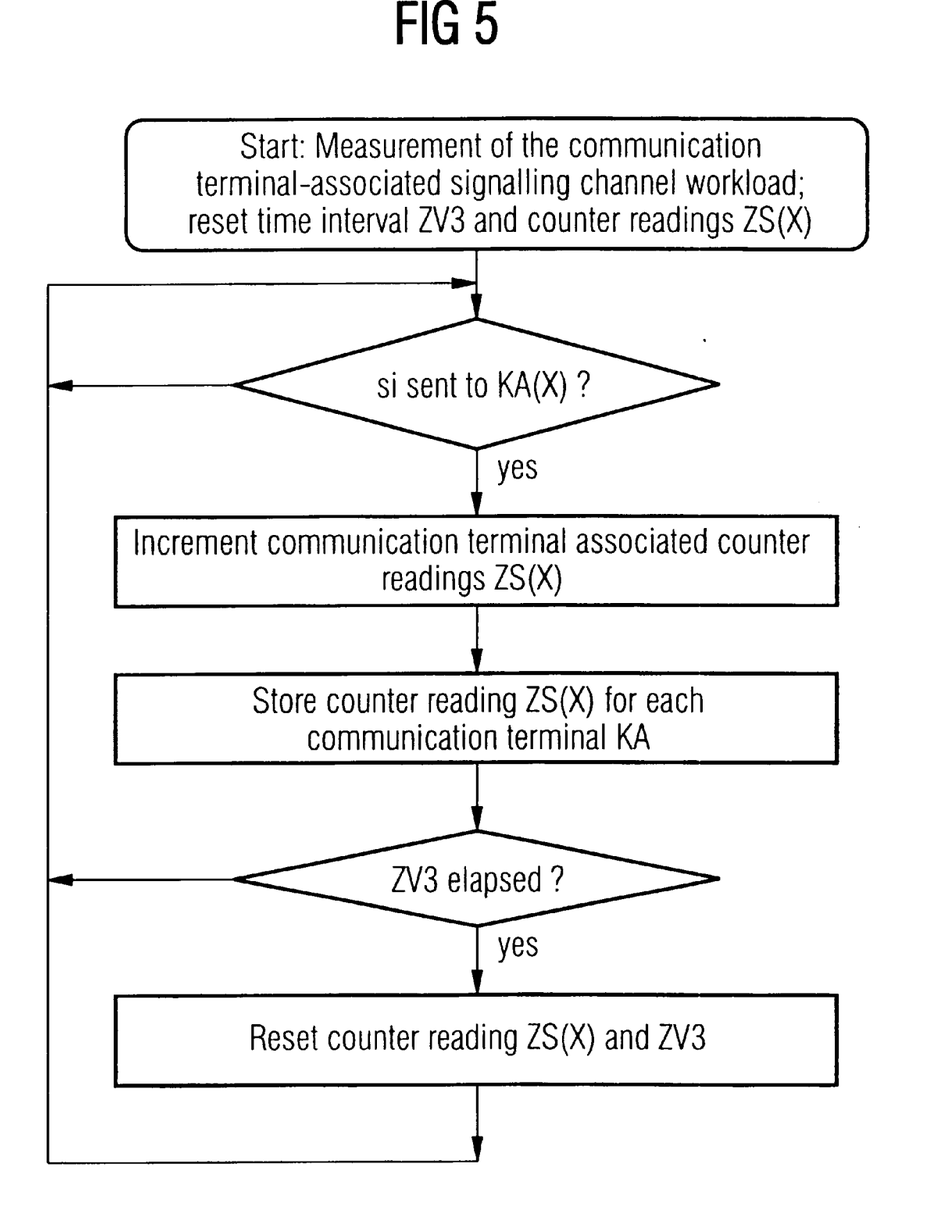
FIG. 5 is a flowchart showing the measurement of the communication-line-associated signaling channel workload.

FIG. 1 shows a communication system KS in which a subscriber line module SLMO is shown by way of example. Communication terminal equipment units KE can be connected to the communication system KS or, respectively, to the subscriber line module SLMO. The communication terminal equipment units KE are operated in the stimulus method (S) (all settings of the communication terminal equipment KE are undertaken proceeding from the communication system KS) or according to a protocol method (P) (after the communication of a signaling message si, the communication terminal equipment KE independently undertakes the settings). The signaling messages si are transmitted via a signaling channel D respectively conducted over a communication port KA, being transmitted together with the useful information ni (for example digitized voice information). In the communication system KS, the subscriber line module SLMO is connected to a control means CCU that coordinates and controls the communication system KS. FIG. 1 also shows the program structure of the subscriber line module SLMO shown by way of example, whereby an identical program structure is realized in the other subscriber line modules SLMO which are not shown. The program structure is structured into different processes explained below. The processes are organized as autonomous tasks that have different priority levels with respect to the message processing (messages from the central control means CCU or from the communication terminal equipment units KE or to the latter).

The communication between the central control means CCU and the subscriber line module SLMO is realized by the two HDLC transmission routines HDLC TASK, HDLC INT. The two HDLC transmission routines HDLC TASK, HDLC INT contain driver routines for the message traffic, whereby the first HDLC transmission routine HDLC TASK is responsible for the transmission of messages m to the central control means CCU, and the second HDLC transmission routine HDLC INT is responsible for the reception of messages in from the central control means CCU. The requests of the HDLC transmission routines HDLC TASK, HDLC INT with the highest priority are processed in the subscriber line module SLMO. The two HDLC transmission routines HDLC TASK, HDLC INT communicate with a front-end device handler VDH in which a switching-oriented pre-processing (call processing) of the signaling information, communicated from the communication terminal equipment units KE, is implemented. A process (realized by a program module IWU-S) for the pre-processing of switching-oriented procedures of a stimulus communication terminal equipment KE(S) is provided in the front-end device handler VDH, as is a process (realized by a program IWU-SO) for processing the switching-oriented messages of a "protocol" communication terminal equipment KE(P) (for example, an ISDN communication terminal equipment with an SO interface). Particularly for forming specific messages for the display devices of stimulus communication terminal equipment KE(S), a layer-3 program L3P is provided, communicates with the program IWU-S via a defined interface IS. The layer-3 program L3P is preferably provided for forming and for handling display messages for all stimulus communication terminal equipment units KE(S) connected to the respective subscriber line module SLMO, whereby the informational content of these display messages is optically displayed in a display means in the respective stimulus communication terminal equipment units KE.

In a further layer-2 program L2P, the layer 2 is realized according to the OSI reference model for user-network signaling and information transfer both in the direction of the central control means CCU as well as in the direction of the communication terminal equipment units KE. This layer 2 assumes that the protected transmission of the signaling information is in both directions for layer 3, i.e. the switching layer.

The layer-2 program L2P communicates with a layer-1 program L1P that represents the linking element to the circuit-oriented transmission and power supply devices for the respectively connected communication terminal equipment units KE. The communication ports KA are activated and deactivated by this layer-1 program L1P, test loops are controlled and a power management is implemented.

An operating system COSMOS is realized for the administration and the operation of the microprocessor system resources. The memory elements SE of a memory element pool SEP are also administered by this operating system COSMOS and are temporarily allocated to the respective processes or, respectively, program modules according to a corresponding request particularly in message processing). The memory element pool SEP together with its memory elements SE is indicated by a broken-line rectangle in the operating system block. Further, a counter Z, with which are counted the memory elements SE of the memory element pool SEP that are still free, is also provided in the operating system COSMOS.

A dependability and A & M (Administration and Maintenance) program module STB is provided for the A & M control, i.e. the A & M settings of the subscriber line module SLMO. All operating parameters with respect to the workload limits required for the overload recognition are also made available by this A & M program module STB. In particular, these are operating parameters about a microprocessor system workload limit GZS, the limit overall message length gzn1, and the interval times IV, as well as a memory element pool workload limit GZ.

Further, the message lengths L of the signaling messages si to be respectively communicated in the direction of the communication terminal equipment units KE are identified in the layer-2 program L2P and are communicated to an overload routine URL. For recognizing the overload condition, the overload routine ULR have a memory element pool measuring routine SEP-MR, a signaling channel measuring routine D-MR, an overload program UP, as well as a signaling channel measuring routine KAD-MR associated to a communication terminal. The overload status is communicated, in particular, to the process for the control of stimulus communication terminal equipment units KE(S) realized by the program IWU-S. It is communicated thereto by level 1 and level 2 overload messages um1, um2. The transmission of the overload messages um1, um2 suppresses the transmission of display messages to individual, particularly overloaded communication ports KA or to all communication ports KA or suppresses the transmission of all signaling messages si to individual or, in particular, to overloaded communication ports KA.

Figure 6:
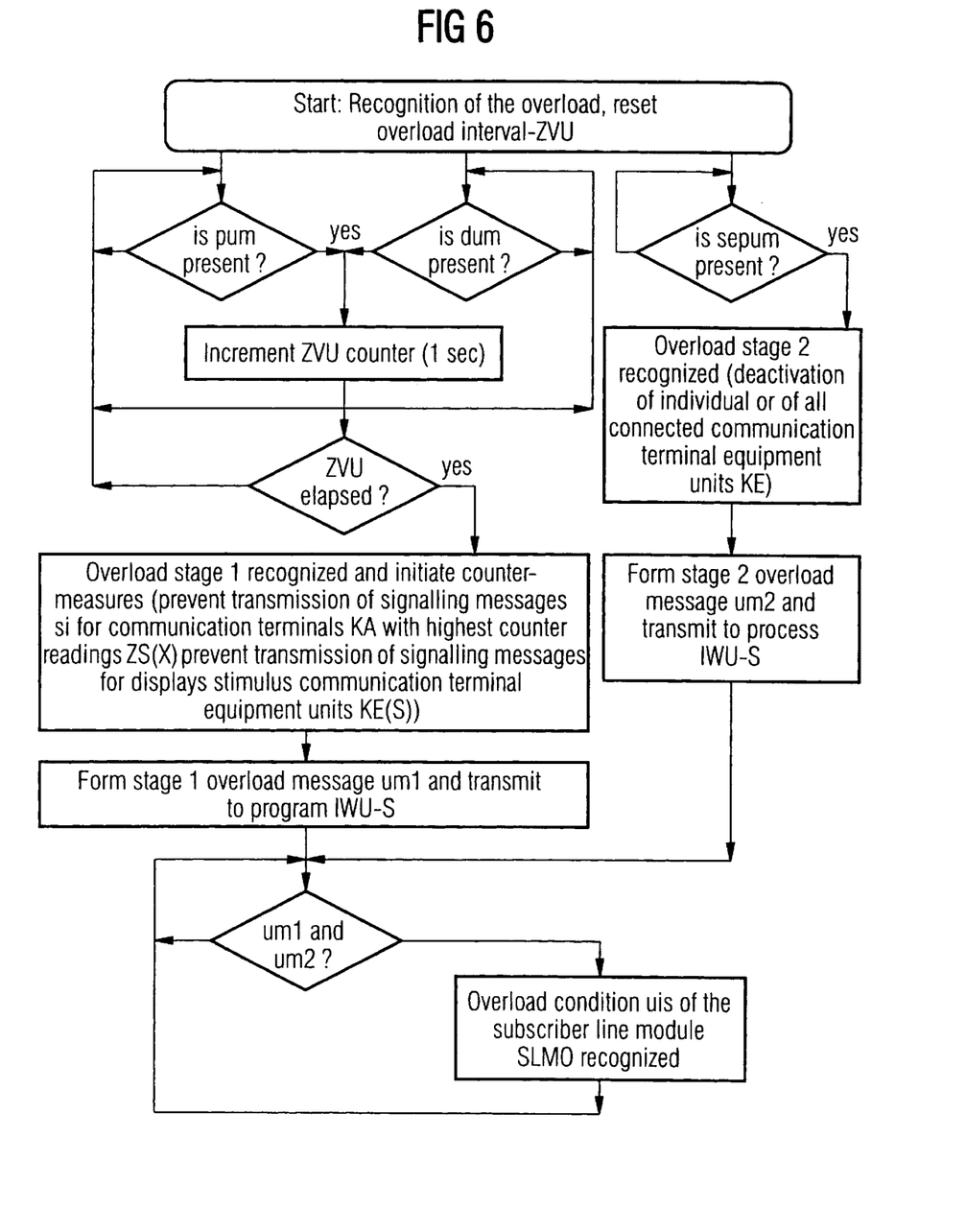
FIG. 6 is a flowchart showing the recognition of the overload.

The methods realized in the measuring routines D-MR, SEP-MR and in the overload program UP are shown in FIGS. 2–6. The respective flowcharts are essentially self-explanatory and, in particular, show the method steps leading to the recognition of an overload with respect to a measurement of the process workload of the microprocessor MPS, the measuring of the signaling channel workload, the measuring of the workload of the memory element pool SEP, the measuring of the signaling channel workload specifically associated to a communication terminal, and a recognition of the overload, including different overload stages. The switching or, respectively, the resetting to the non-overloaded condition of the subscriber line module SLMO is not shown in FIG. 6, whereby a reset message rsm effecting the resetting of the first overload stage is formed and communicated to the process realized by the program module IWU-S given an overload of the microprocessor system MPS and of the signaling channel D during the overload interval ZVU that is not continuously present. Analogous thereto, a reset message rsm effecting the resetting of the second overload stage is formed and communicated to the affected units given non-presence of a memory element pool overload message sepum. When no message um1, um2 indicating the overload is present, an overload condition of the subscriber line module SLMO is consequently also not reported, i.e. the subscriber line module SLMO is in normal operation. This relationship is indicated in FIG. 6 by the designation rsm, whereby, however, different procedure executions (not shown) must be taken into consideration.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for recognizing overload situations of subscriber line modules, the subscriber line modules having communication ports connected to communication terminal equipment and connected to a central controller of a communication system, each of the subscriber line modules having a microprocessor system for processing switching and operating processes organized in tasks, comprising the steps of:

forming, in a respective subscriber line module of the subscriber line modules, signaling messages to be communicated to connected communication terminal equipment units and sending the signaling messages via signaling channels individually associated to a communication port of the respective subscriber line module;

temporarily allocating memory elements from a memory element pool in the respective subscriber line module to processes for inter-process communication and for resource management;

measuring in the respective subscriber line module a workload of the microprocessor system, a workload of all signaling channels, and a workload of the memory element pool; and respectively comparing in the respective subscriber line module the measured workloads to predetermined workload limits and recognizing an overload of the respective subscriber line module dependent on results of the comparisons.

2. The method according to claim 1, wherein a plurality of overload stages are recognized by comparisons of the measured workloads to respectively different, predetermined workload limits.

3. The method according to claim 1, wherein given transgression of the measured workloads above the predetermined workload limits, an overload is recognized and, given transgression of the measured workloads below the predetermined workload limits, a normal load of the subscriber line module is recognized.

4. The method according to claim 3, wherein a transgression of the workload limits is identified by a transgression of the measured workloads above or below the predetermined workload limits within predetermined time intervals.

5. The method according to claim 1, wherein, for determining the workload of the microprocessor system the method further comprises measuring a plurality of no-load tasks processed by the microprocessor system within a predetermined time interval; defining a workload limit by a predetermined plurality of no-load tasks with reference to a predetermined time interval; and defining a transgression of the workload limit by a transgression of the measured pluralities of no-load tasks over or below the predetermined plurality of no-load tasks.

6. The method according to claim 5, wherein a counter is incremented when processing a no-load task, a counter reading of the counter being stored after every time interval and the counter being reset to a defined counter reading.

7. The method according to claim 5, wherein, given a constant transgression of the workload limit within the predetermined time interval, a message is formed indicating a first overload condition.

8. The method according to claim 1, wherein, for determining the workload of the signaling channels directed to the communication terminal equipment units, the method further comprises: acquiring lengths of all signaling messages in a predetermined time interval and summing up the acquired lengths to form an overall message length; defining a workload limit by a limit message length referred to the time interval; and defining a transgression of the workload limit by a transgression of the measured overall length above or below a predetermined limit message length.

9. The method according to claim 8, wherein, given a constant transgression of the workload limit within the predetermined time interval, a message is formed indicating a first overload condition.

10. The method according to claim 1, wherein, for determining the workload of the memory element pool, the method further comprises: measuring the plurality of memory elements that are still free; defining a workload limit by a predetermined plurality of memory elements that are still free; and defining a transgression of the workload limit by a transgression of the measured plurality of memory elements that are still free below or above the predetermined plurality of memory elements that are still free.

11. The method according to claim 10, wherein the plurality of memory elements that are still free is measured after every transmission of a signaling message to a connected communication terminal equipment.

12. The method according to claim 1, wherein the method further comprises: counting the number of signaling messages communicated via a signaling channel of a communication port to communication terminal equipment in predetermined time intervals; and storing the communication ports with the highest numbers.

13. The method according to claim 12, wherein the signaling messages of the communication ports over which the highest number of signaling messages is currently communicated are suppressed.

14. The method according to claim 12, wherein the communication ports via which the highest number of signaling messages are currently communicated are deactivated.

15. The method according to claim 1, wherein, following a recognition of an overload or of an overload stage of a plurality of overload stages of the respective subscriber line module, at least one procedure is initiated for reducing the overload.

16. The method according to claim 15, wherein, following a recognition of an overload condition with respect to the microprocessor system and the signaling channel, a first stage of a procedure reducing the overload is initiated and, given recognition of the overload with respect to the memory elements of the memory element pool that are still free, a second stage of a measure reducing the overload is initiated.

17. The method according to claim 16, wherein the second stage of a procedure reducing the overload is realized by inactivation of at least one of the communication terminals.

18. The method according to claim 17, wherein the communication ports via which the highest number of signaling messages are currently communicated are deactivated.

19. The method according to claim 15, wherein, given a procedure of a first stage for reducing the overload, signaling message to be optically or audibly output in the communication terminal equipment units are no longer sent to highly overloaded communication terminal equipment units.

20. The method according to claim 19, wherein the signaling messages of the communication ports over which the highest number of signaling messages is currently communicated are suppressed.

21. The method according to claim 1, wherein, following a further recognition of an overload after an implementation of procedures reducing the overloads, one of a restart or new start of the respective subscriber line module is initiated.

* * * * *